Nov. 24, 1953  J. F. ANETSBERGER ET AL  2,660,133
DOUGH SLICING APPARATUS
Filed Aug. 13, 1951  2 Sheets-Sheet 1

INVENTOR.
Joseph F. Anetsberger
& Frank A. Anetsberger
BY Sheridan, Davis & Cargill
Att'ys Nov. 24, 1953   J. F. ANETSBERGER ET AL   2,660,133
DOUGH SLICING APPARATUS
Filed Aug. 13, 1951   2 Sheets-Sheet 2

INVENTORS:
Joseph F. Anetsberger &
By Frank A. Anetsberger
Sheridan, Davis & Cargill
Att'ys Patented Nov. 24, 1953

2,660,133

UNITED STATES PATENT OFFICE 2,660,133

DOUGH SLICING APPARATUS

Joseph F. Anetsberger, Northbrook, and Frank A. Anetsberger, Chicago, Ill., assignors to Anetsberger Brothers, Inc., Northbrook, Ill., a corporation of Illinois Application August 13, 1951, Serial No. 241,518

6 Claims. (Cl. 107—21)

This invention relates to improvements in dough slicing apparatus.

In bakeries, dough which has been sheeted or sheeted and rolled or folded frequently must be cut to predetermined lengths in making certain bakery products. Tables provided with endless belt conveyors which carry the dough from a sheeting apparatus are common, and as the dough moves at a controlled velocity on the conveyor toward the discharge end of the table it normally is subjected to various operations incident to the making of particular bakery products. The continuous sheet of dough or the relatively long strips of dough usually are cut or sliced to provide products of the desired size while the dough passes along or through a cutting station which may be at or adjacent the end of the table, although not necessarily so.

For the purpose of obtaining uniform and satisfactory slicing action with a mechanically operated vertically reciprocal blade or knife, some conveyors have been provided with a step-by-step or intermittent movement whereby the blade of the slicing apparatus can be passed down through the dough and removed therefrom during the intervals when the conveyor is stationary. Such coaction of the operating means of the conveyor and blade avoids displacement of the dough on the conveyor immediately at the rear of the blade and avoids the tendency of the dough to pile up at the rear of the blade such as occurs where a vertically reciprocal blade passes through a sheet of dough while the latter is moving at right angles to the blade. While such tendency of the dough to accumulate behind the reciprocal blade during the relatively short periods of time the blade is making a cut or slice of the dough and withdrawing from the dough is slight, imperfect or irregular pieces sometimes are caused by the resulting disturbances of the dough sheet and it is an object of the present invention to provide an improved dough slicing apparatus for use with a continuously moving dough conveyor which avoids even momentary interruption of movement of the dough immediately at the rear of the blade during the slicing operations.

Another more specific object of the invention is to provide a dough slicing apparatus having a vertically reciprocal blade which swings through a desired arc about a horizontal axis in the direction of movement of the dough during the slicing operations and which on the upstroke is restored to a vertical plane whereby the blade, due to its forward swinging movement, avoids impeding the forward movement of the dough immediately to the rear of the blade during the short intervals that it moves within the dough and whereby, due to the restoration of the blade on the upstroke to a vertical position, the successive cuts made in the dough will be uniformly spaced where the rate of reciprocation of the blade and the rate of travel of the conveyor are uniform.

Another object of the invention is to provide a dough slicing apparatus provided with a swingable blade and means for restraining to the desired extent such swinging movement for stabilizing the action of the blade.

Other objects of the invention relate to various features of construction and arrangements of parts which will be apparent from a consideration of the following specification and accompanying drawings, wherein.

Figure 2:
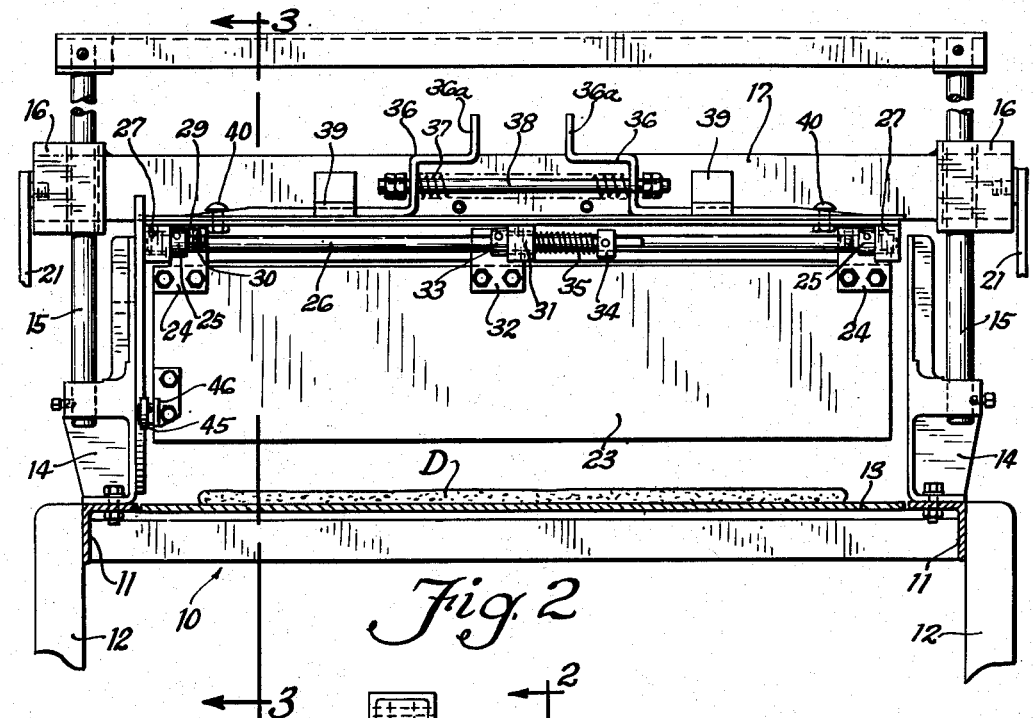
Fig. 2 is a transverse sectional view taken on the line 2—2 of Fig. 1.

In the drawings, the bakery table is indicated generally by the numeral 10 and in the form illustrated comprises longitudinal L-shaped frame members 11 which are supported at a convenient height above the floor by the legs 12. The table is provided with an endless conveyor, the upper run 13 of which is shown in the drawings. Located at any convenient place along the table on the members 11 are two vertical supports 14. The supports are provided with vertical cylindrical standards 15 constituting guides for reciprocal blocks or the like 16 which slide upon the standards. The blocks or members 16 are connected by a cross head which may be of angular shape in cross-section and which is indicated by the numeral 17. Power operated disks 18, mounted on a shaft 19, are located at opposite sides of the table and each disk is eccentrically connected at 20 to a pitman or operating arm 21 which at its upper end, as at 22, is connected to one of the blocks 16. Rotation of the shaft by a suitable power means (not shown) rotates the disks 18 and through the action of the arms 21 effects reciprocation of the cross head 17.

The reciprocating cross head is adapted to carry a knife support which is provided with a blade for slicing the dough which is carried on the upper run 13 of the conveyor as the dough is moved progressively beneath the blade. The blade is indicated by the numeral 23 and as shown in Fig. 2 is attached by hinge members to the blade support. The hinge members comprise leaves 24 secured to the blade and having eyes 25 staked to a transverse rod 26. The ends of the rods project into bores provided in blocks 27 which are welded or otherwise secured to a blade support in the form of a transversely disposed angle member 28. The eyes 25 are provided with lateral extensions 29 carrying adjustable threaded studs 30 which may be adjusted with reference to the extensions whereby the upper ends of the studs will engage the under surface of the horizontal flange of the angle member 28 for limiting swinging movement of the blade 23 in a clockwise direction, as viewed in Fig. 3.

A central rod support or bearing 31 is provided approximately midway between the similar end blocks 27 and is provided with a bore through which the rod 26 passes. An intermediate hinge 32 is secured to the blade and has an eye 33 through which the rod passes and is located adjacent the support 31, as shown in Fig. 2. On the opposite side of the support 31 is a collar 34 adjustably secured to the rod by a set screw or the like in a position spaced from the support 31 and arranged to hold a helical spring 35 under compression between the collar and the support whereby the spring urges the shaft to the right, as viewed in Fig. 2, for the purpose of holding the eye 28 of the right-hand hinge, as well as the intermediate eye 33, or at least one of the same, against the adjacent support for providing sufficient friction for restraining free swinging movement of the blade, and particularly to retain the blade in the vertical position during the downstroke. Adjusting the collar 34 to the left or right will increase or decrease respectively the force exerted axially of the rod by the spring and thus vary the frictional resistance which, as stated, restrains the free swinging action of the blade and prevents erratic swinging action thereof when rapidly operated.

Figure 1:
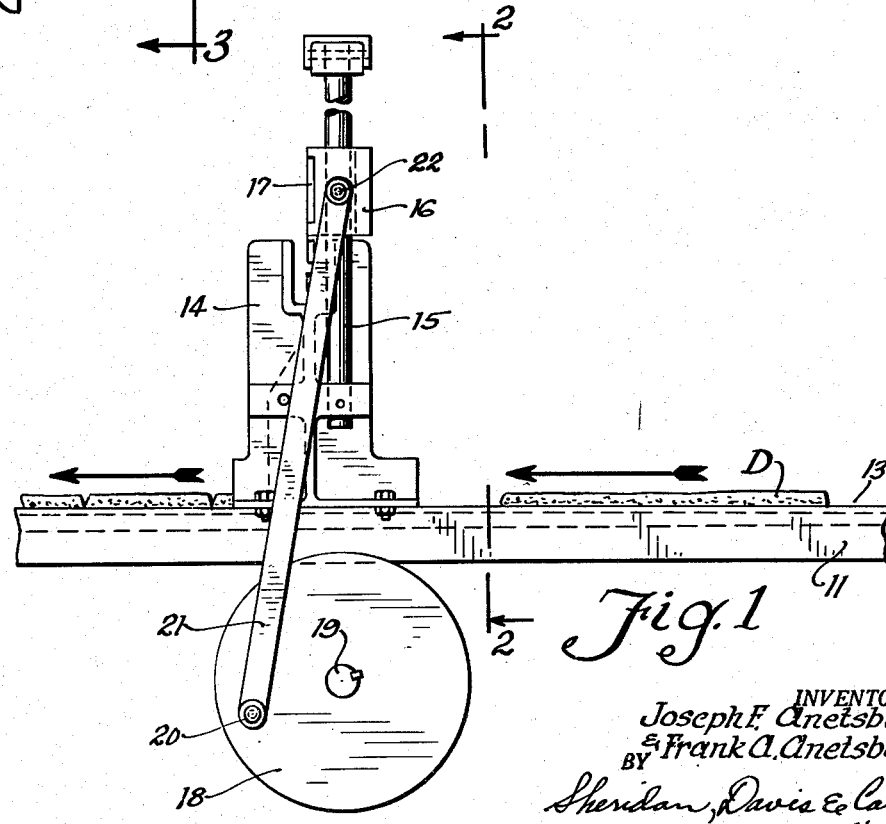
Figure 1 is a side elevational view showing a portion of a bakery table having a longitudinally moving conveyor and a dough slicer embodying the present improvements mounted on the table.

Suitable means are provided for attaching the blade support 28 to the cross head 17, and such means preferably is of a character which enables the blade structure readily to be attached in or detached from operative position. The means shown constitutes in part a portion of the cross head and, as shown in Fig. 2, comprises a pair of slidable locking bars 36 of similar form and having upwardly turned manually engageable portions 36a which may be grasped manually when the bars are to be moved one toward the other against the action of a compression spring 37 mounted on a rod 38, the ends of which project through openings in intermediate vertical portions of the bars. The spring thus tends to force the bars in opposite directions. The bars are guided in their sliding action upon the horizontal flange of the cross head 17 by means of guides 39. The ends of the bars are slotted or bifurcated as well as beveled on the upper side, and are adapted to engage beneath the heads of bolts 40 which are secured to the horizontal flange of the blade support 28. The bolts are adapted to be passed up through openings provided in the horizontal flange of the cross head 17 when the locking bars 36 are in retracted positions and whereby, upon release of the finger pieces 36a, the spring presses the locking bars in opposite directions, whereby the bifurcated beveled ends of the bars engage the under sides of the bolt heads for releasably supporting the knife structure in the position shown in Fig. 1.

When the knife structure has been attached to the reciprocal cross head 17 and the power is applied to the shaft 19, the cross head reciprocates vertically and the lower sharpened edge of the blade will descend on the downward stroke of the head into contact with the supporting conveyor 13, which is provided with an adequate supporting base 41 for preventing downward deflection of the conveyor. The dough passing beneath the blade will thus be severed into pieces, the length of which (considered longitudinally) depends on the rate of reciprocation of the blade and the velocity of travel of the conveyor.

Figure 3:
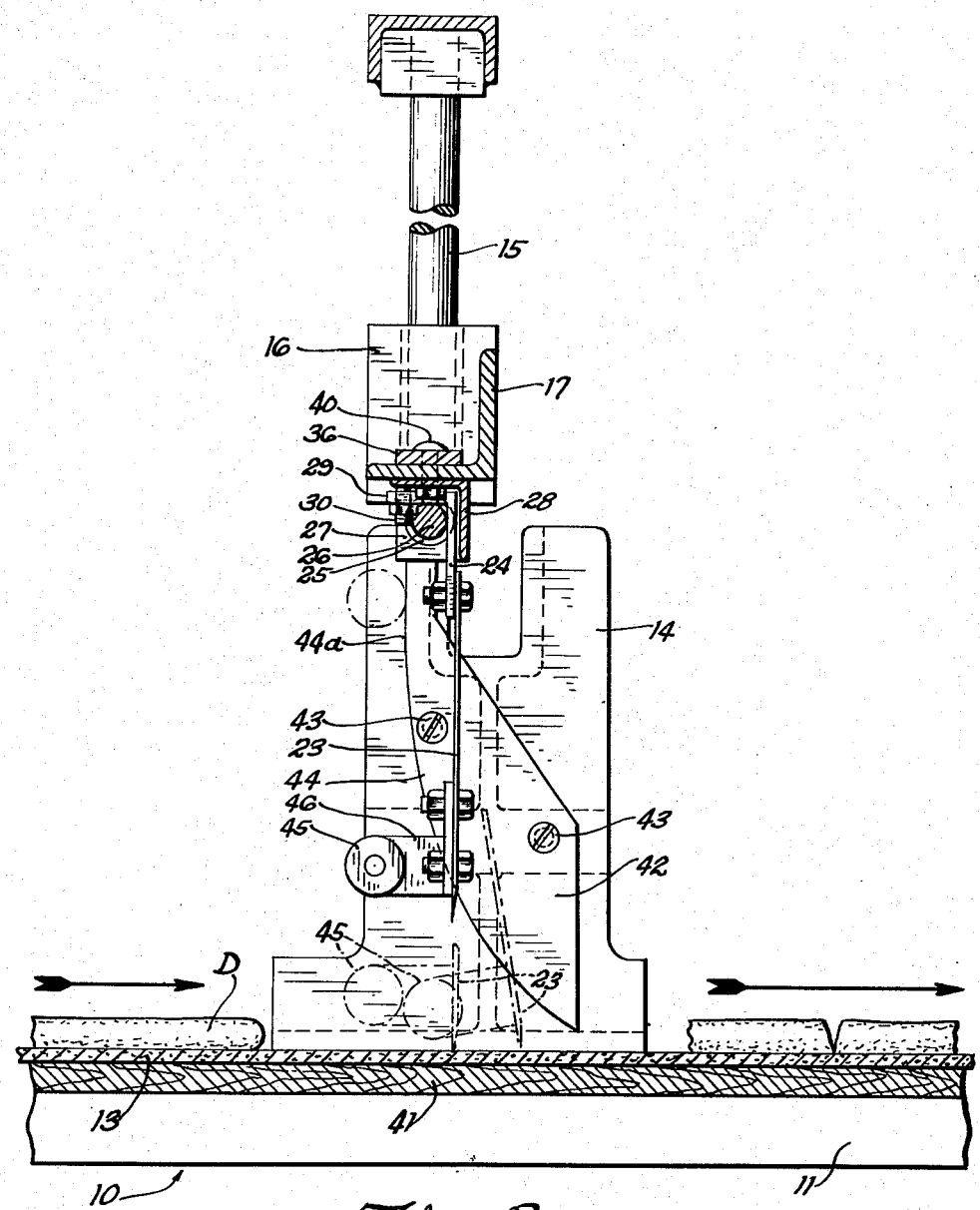
Fig. 3 is an enlarged vertical sectional view taken on line 3—3 of Fig. 2.

As the blade enters the strip of dough D on the conveyor, the movement of the dough along the conveyor tends to deflect the blade to the right or counter-clockwise as viewed in Fig. 3. If the dough sheet is relatively thin, the dough itself will not effect any substantial counter-clockwise deflection of the blade. Thicker dough, however, will do so, but in any event, as the blade touches the moving conveyor it can swing counter-clockwise by reason of the pivotal mounting of the blade upon the rod 26, as above described. Hence, such movement of the blade avoids impeding the continuous movement of the dough immediately to the left of the blade as viewed in Fig. 3. On the upstroke of the blade, it will be returned from the angular position above mentioned to a vertical position by suitable means such as by the coaction of a roller carried by the blade and a suitable cam member.

In Fig. 3 a cam in the form of a plate member 42 is shown secured by screws 43 to one of the supports 14. In the embodiment of the invention shown, the left-hand support shown in Fig. 2 carries the plate 42. The plate has an edge 44 which in the lower portion is curved, as shown in Fig. 3, the curved portion merging into an upper vertical portion 44a, the edge constituting a guiding cam surface. The left end of the blade 23, as viewed in Fig. 2, is provided with a cam follower shown in the form of a roller 45 mounted on a bracket 46 which is attached to the blade. As shown in Fig. 2, the follower 45 is disposed in the vertical plane of the cam plate 42. During the upstroke of the blade, after having been swung forwardly from the vertical position by the dough or by contact with the moving conveyor as above described or by both, the follower will contact the curved portion of the cam surface 44, and as the roller follows the surface upwardly, the blade will be restored to the vertical position shown in full lines in Fig. 3. Such rearward swinging movement does not begin generally until the blade has been raised from the dough. Actually in some instances the rearward swinging movement may continue during an initial portion of the upstroke or until the blade has been raised above the forwardly moving dough. Since the reciprocating movements of the blade usually are rapid, the adjustable stop screws 30 above described are provided, which, as will be seen, prevent swinging movement of the blade in a clockwise direction beyond the vertical position following contact of the follower 45 with the cam surface of the plate 42.

The provision of means for applying suitable friction between the rod bearing 31 and the adjacent eye of the hinge 32 or the corresponding members at the right-hand portion of the blade structure, as viewed in Fig. 2, stabilizes the action of the blade against back and forth vibratory action by restraining to a limited extent free swinging movement of the blade upon the pivotal axis provided by the bar 26. It will thus be seen that as the dough moves from left to right on the conveyor beneath the slicing apparatus, it will be severed transversely of the dough strip D by the blade. The length of the dough pieces can be varied by varying the rate of reciprocation of the blade or by varying the rate of travel of the conveyor, or by both by use of conventional variable speed drives, not shown. The swinging action imparted to the blade, as above described, avoids objectionable build-up of the dough immediately behind the blade as viewed in Fig. 3 while the blade is passing upwardly or downwardly through the dough. The improved slicing mechanism can thus be used satisfactorily with continuously operating dough feeding mechanism.

While various features of a particular structure have been shown for the purpose of illustrating the invention, it will be apparent that various changes in the details of the apparatus shown may be resorted to without departure from the spirit of the invention defined by the appended claims.

What is claimed is:

1. In dough slicing mechanism for use in conjunction with a dough conveyor belt, a pair of side supports comprising vertical guides adapted for location at opposed sides of the belt, a cross head slidable vertically on the guides, means for reciprocating the cross head, a blade support adapted for attachment to the cross head for vertical reciprocation thereby, said blade support comprising a transverse member provided with end supports for a blade supporting pivot member, a normally vertical blade having a lower cutting edge and secured at the upper edge to said pivot member and depending therefrom and swingable through a limited arc about the axis of the pivot member, the lower edge of the blade being disposed parallel with the upper surface of the belt for contacting the belt at the limit of downward movement of the blade and being swingable forwardly by the force exerted thereon upon contact with the moving belt and dough thereon during slicing operations, means for restoring the blade to a vertical position during each upstroke thereof, and friction producing means cooperable with the pivot member for restraining free swinging movement of the blade as the latter approaches the dough during the downstrokes of the blade.

2. In dough slicing mechanism for use in conjunction with a dough conveyor belt, a pair of side supports comprising vertical guides adapted for location at opposed sides of the belt, a cross head slidable vertically on the guides, means for reciprocating the cross head, a blade support adapted for attachment to the cross head for vertical reciprocation thereby, a dough slicing blade, cooperating hinge means on the blade and blade support for securing the blade to the support normally in a vertical position and for swinging movement on a horizontal axis, said blade having a lower cutting edge disposed parallel with the belt and arranged to contact the moving belt at the limit of each downstroke of the blade whereby the blade is swung forwardly during each slicing operation, means for swinging the blade rearwardly to a vertical position during the upstrokes of the blade, and means for applying friction to said hinge means for restraining free swinging movement of the blade as the same approaches the dough on the downstroke of the blade.

3. In dough slicing mechanism for use in conjunction with a dough conveyor belt, a pair of side supports comprising vertical guides adapted for location at opposite sides of the belt, a cross head slidable vertically on the guides, means for reciprocating the cross head, a blade support adapted for attachment to the cross head for vertical reciprocation thereby, a depending vertical blade pivotally attached at the upper edge thereof to said blade support for swinging movement on a horizontal axis, the lower edge of the blade being sharpened and adapted to slice through the dough sheet on the conveyor and to make contact with the moving conveyor at the limit of each downward stroke thereof whereby the blade is swung forwardly about said axis, means imparting rearward swinging movement to the blade to the vertical position during each upstroke thereof, and means for arresting the rearward swinging movement of the blade in vertical position.

4. In dough slicing mechanism for use in conjunction with a dough conveyor belt, a pair of side supports comprising vertical guides adapted for location on opposed sides of the belt, a cross head slidable vertically on the guides, means for reciprocating the cross head, a knife support adapted for attachment to the cross head for vertical reciprocation thereby, a depending blade pivotally attached at the upper edge thereof to said support for swinging movement on a horizontal axis, the lower edge of the blade being sharpened and adapted to slice through the dough sheet on the conveyor and to make contact with the moving conveyor at the limit of each downward stroke of the blade whereby the blade is swung forwardly, means moving the blade to the vertical position during each upstroke thereof, and means resisting free swinging movement of the blade as the same approaches the dough during the downstroke thereof.

5. In combination with a dough table provided with a dough conveyor, a pair of upright members at opposed sides of the conveyor, a cross head reciprocal on said members, said cross head comprising a transverse member provided with a pair of spaced apart vertical openings therein, a pair of spring actuated latches slidably mounted on the transverse member and provided with bifurcated ends for engaging the heads of headed studs extended through said openings, and a knife structure comprising a transverse blade supporting member provided with vertical headed studs spaced apart in correspondence with the openings in the cross head and adapted to be passed through said openings for engagement by the bifurcated ends of the latches for releasably securing the knife structure to the cross head.

6. In dough slicing mechanism for use in conjunction with a work table provided with a dough conveyor, a pair of standards adapted for disposition on the table at opposite sides of the conveyor, vertical guides secured to the standards, a cross head slidable vertically along the guides in a vertical plane above the conveyor, means for reciprocating the cross head, a plate cam secured to one of said standards on the side thereof adjacent the conveyor and provided with a cam surface consisting of an upper vertical portion and a lower portion extending arcuately in a forward direction, a blade structure attached to said cross head and comprising a depending blade swingable on a horizontal axis located adjacent the upper end of the blade and having a sharpened lower edge parallel with the plane of the conveyor and adapted to contact the same upon each downstroke of the cross head and to be swung pivotally in the direction of travel of the conveyor by such contact at the limit of each downward stroke of the blade, and a cam follower carried by the blade and projecting therefrom into the plane of said cam surface for engaging the lower arcuate portion of the cam surface for effecting rearward movement of the cam follower for restoring the blade to a vertical position as the cam follower moves into contact with the vertical portion of the cam surface during each upstroke of the blade.

JOSEPH F. ANETSBERGER.
FRANK A. ANETSBERGER.

References Cited in the file of this patent

UNITED STATES PATENTS

| Number | Name | Date |
|---|---|---|
| 2,206,312 | Werner | July 2, 1940 |
| 2,478,020 | Stiles | Aug. 2, 1949 |
| 2,576,533 | Ott | Nov. 27, 1951 |

FOREIGN PATENTS

| Number | Country | Date |
|---|---|---|
| 286,015 | Germany | July 21, 1915 |